US00RE38830E

(19) United States
(12) Reissued Patent
Wang et al.

(10) Patent Number: US RE38,830 E
(45) Date of Reissued Patent: Oct. 18, 2005

(54) STAND ALONE VIDEOPHONE

(75) Inventors: Chia-Wen Wang, Hsinchu (TW); Yu-Lin Chao, Hsinchu (TW); Jeng-Yeong Tyan, Hsinchu (TW)

(73) Assignee: Industrial Technology Research Institute, Hsinchu (TW)

(21) Appl. No.: 29/155,464

(22) Filed: Jan. 23, 2002

Related U.S. Patent Documents

Reissue of:
(64) Patent No.: Des. 402,978
Issued: Dec. 22, 1998
Appl. No.: 29/082,839
Filed: Jan. 28, 1998

(30) Foreign Application Priority Data

Nov. 13, 1997 (CN) ..... 86309724

(51) LOC (8) Cl. ..... 14-03
(52) U.S. Cl. ..... D14/130
(58) Field of Search ..... D14/329, 330, D14/447, 148, 147, 149–151, 136, 140–142, 240, 241, 129, 130, 144, 317; 379/420.01, 420.02, 420.03, 419, 420.04, 428.02, 428.01, 428.04, 428.03, 454, 440, 90.01, 93.17, 93.19, 433–436, 900, 441; 348/14.01–14.16

(56) References Cited

U.S. PATENT DOCUMENTS 4,220,828 A * 9/1980 Ruzic ..... 379/369
D315,557 S * 3/1991 Grewe et al. ..... D14/130
D321,870 S * 11/1991 Beecher, II et al. ..... D14/130
D342,247 S * 12/1993 Desbarats ..... D14/130
D345,557 S * 3/1994 Akatsu et al. ..... D14/151
D345,972 S * 4/1994 Grewe et al. ..... D14/130
5,389,965 A * 2/1995 Kuzma ..... 348/14
D356,791 S * 3/1995 Desbarats ..... D14/130
5,396,269 A * 3/1995 Gotoh et al. ..... 348/14
D374,230 S * 10/1996 Nuttall et al. ..... D14/151
5,790,180 A * 8/1998 Wild ..... 348/16
D398,302 S * 9/1998 Lio ..... D14/130

* cited by examiner

*Primary Examiner*—Jeffrey Asch
(74) *Attorney, Agent, or Firm*—Christensen O'Connor Johnson Kindness PLLC

(57) CLAIM

The ornamental design for a stand alone videophone, as shown and described.

DESCRIPTION

FIG. 1 is a top front perspective view of a stand alone videophone showing our new design;
FIG. 2 is a top plan view thereof;
FIG. 3 is a front elevational view thereof;
FIG. 4 is a rear elevational thereof;
FIG. 5 is a bottom plan view thereof;
FIG. 6 is a right side elevational view thereof;
FIG. 7 is a left side elevational view thereof; and,
FIG. 8 is a top front perspective view thereof corresponding to FIG. 1 but with parts in different positions.

1 Claim, 4 Drawing Sheets

Figure 1:
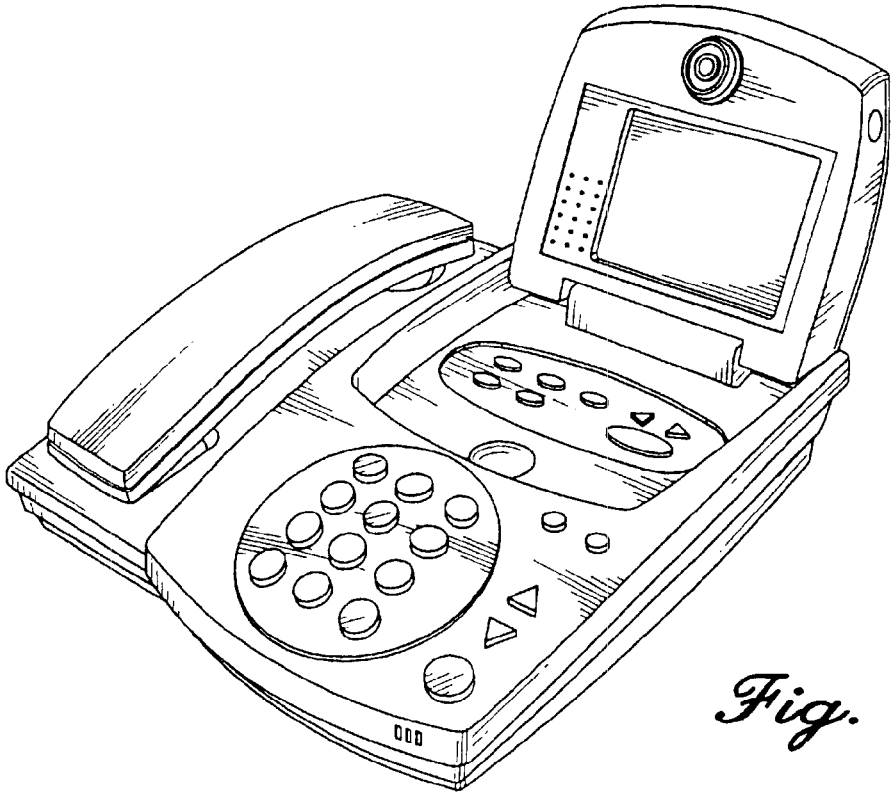
Figure 8:
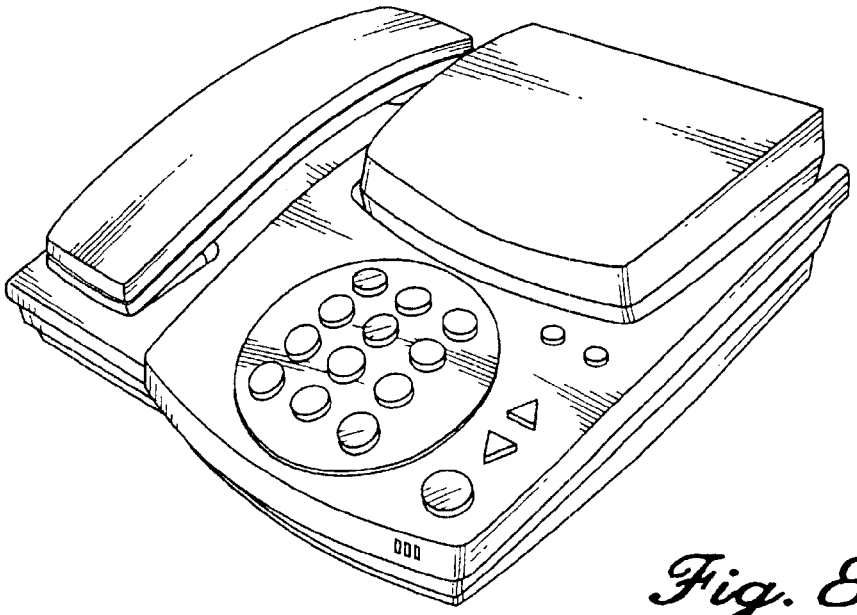
Figure 2:
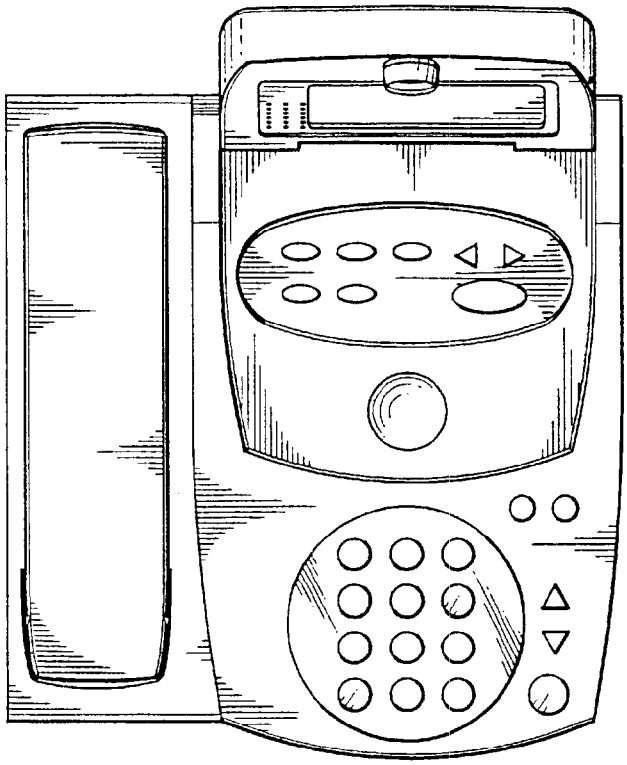
Figure 3:
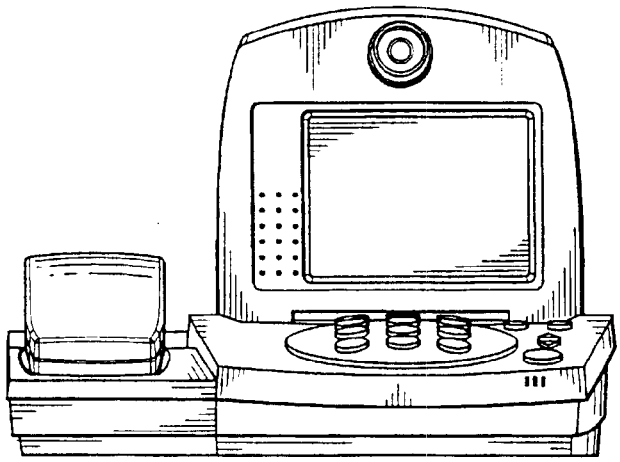
Figure 4:
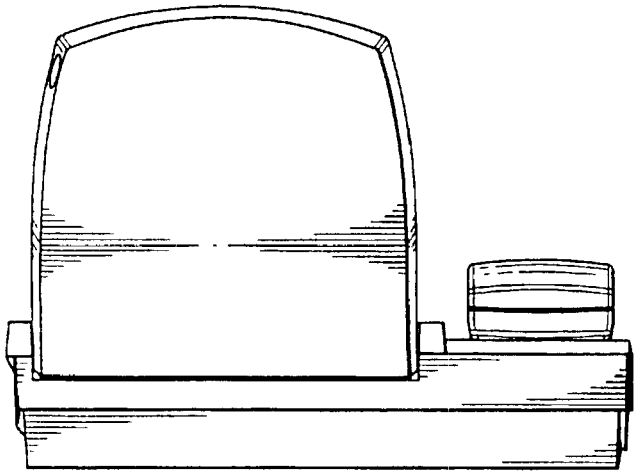
Figure 5:
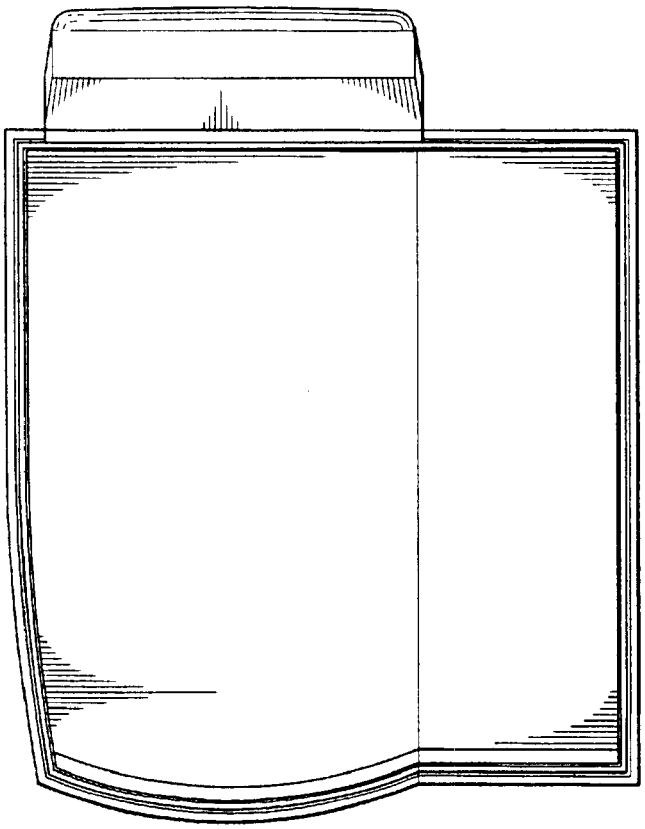
Figure 6:
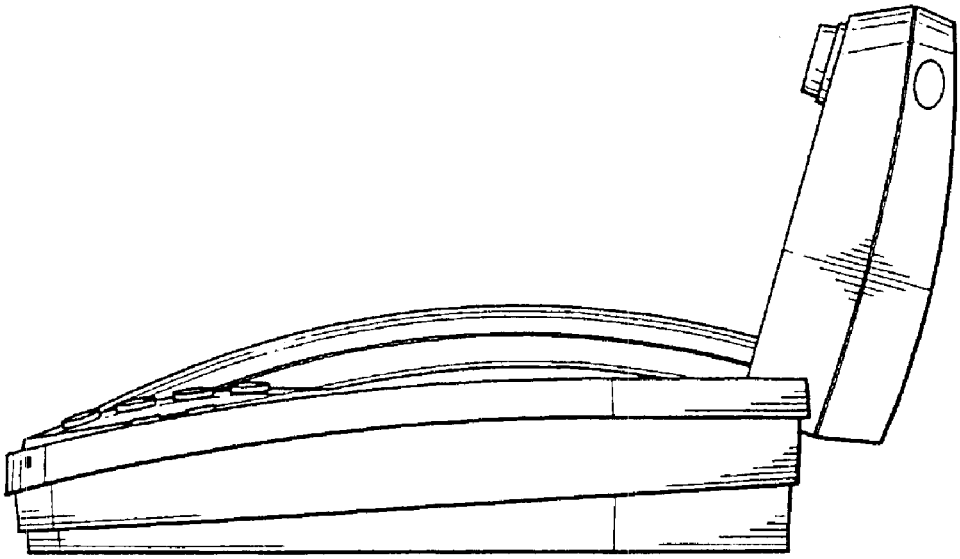
Figure 7:
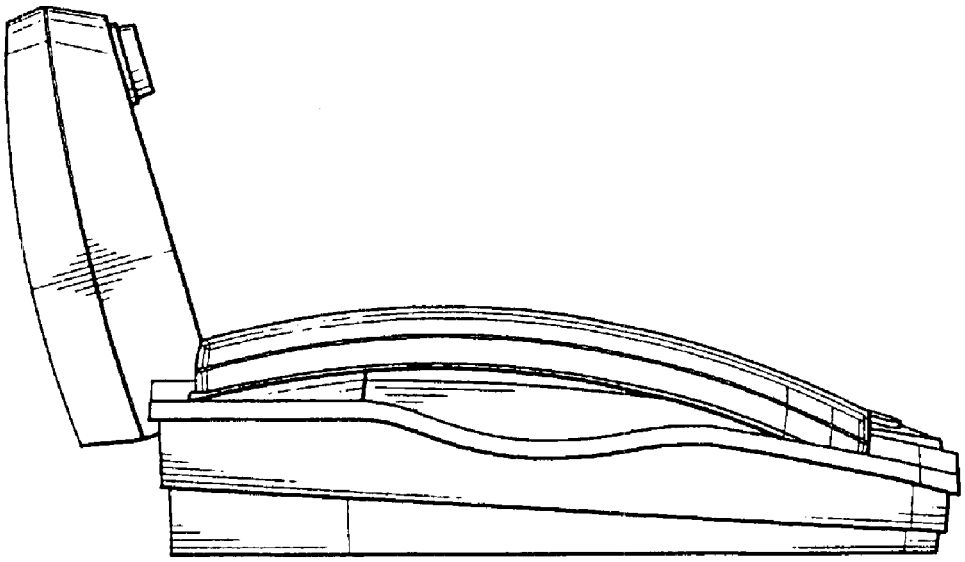

Matter enclosed in heavy brackets [ ] appears in the original patent, but forms no part of this reissue; matter printed in italics indicated the additions made by reissue.